(12) United States Patent
Chalkias et al.

(10) Patent No.: US 12,101,301 B1
(45) Date of Patent: Sep. 24, 2024

(54) ZERO-KNOWLEDGE PROOFS FOR LOGIN

(71) Applicant: Mysten Labs, Inc.

(72) Inventors: Konstantinos Chalkias, Menlo Park, CA (US); Arnab Roy, Fremont, CA (US); Sai Krishna Deepak Maram, Jersey City, NJ (US); Joy Wang, Brooklyn, NY (US); Adeniyi Abiodun, San Jose, CA (US); Lola Oyelayo-Pearson, Toronto (CA); Ben Riva, Givatayim (IL); Jonas Lindstrøm, Lollandsgade (DK); Jordan Gensler, Lake Oswego, OR (US); Pavlos Chrysochoidis, London (GB)

(73) Assignee: Mysten Labs, Inc., Palo Alto, CA (US)

( * ) Notice: Subject to any disclaimer, the term of this patent is extended or adjusted under 35 U.S.C. 154(b) by 0 days.

(21) Appl. No.: 18/222,623

(22) Filed: Jul. 17, 2023

(51) Int. Cl.
H04L 9/40 (2022.01)

(52) U.S. Cl.
CPC ...... H04L 63/0421 (2013.01); H04L 63/0428 (2013.01); H04L 63/0807 (2013.01)

(58) Field of Classification Search
CPC ............ H04L 63/0421; H04L 63/0428; H04L 63/0807
See application file for complete search history.

(56) References Cited

U.S. PATENT DOCUMENTS

| | | | |
|---|---|---|---|
| 2004/0268121 A1* | 12/2004 | Shelest | H04L 63/029 726/15 |
| 2006/0101507 A1* | 5/2006 | Camenisch | G06F 21/33 726/5 |
| 2016/0119141 A1* | 4/2016 | Jing | H04L 9/3221 713/156 |
| 2020/0280854 A1* | 9/2020 | Kunz | H04W 12/0431 |
| 2020/0356659 A1* | 11/2020 | Chen | G06Q 50/265 |

FOREIGN PATENT DOCUMENTS

WO    WO-2023000248 A1 * 1/2023

OTHER PUBLICATIONS

Melissa Chase and Anna Lysyanskaya, "On signatures of knowledge," in Cynthia Dwork, editor, CRYPTO 2006, vol. 4117 of LNCS, pp. 78-96. Springer, Heidelberg, Aug. 2006.
(Continued)

*Primary Examiner* — Yonas A Bayou
(74) *Attorney, Agent, or Firm* — Polsinelli PC (57) ABSTRACT

The present technology can allow a user to use the OpenID Connect protocol to login to an account that has an anonymous user account ID. More specifically, the present technology can programmatically combine information received from an OpenID provider during the OpenID Connect protocol with a random value to yield a unique anonymous user account ID. The present technology also makes use of the ability within the OpenID Connect protocol to embed a chosen nonce into the token signed by the OpenID provider. This allows for embedding hashes of cryptographic keys, like signature verification keys, into ID tokens received from the OpenID provider that authenticates the user. Subsequently, the user can sign messages that can be verified using the verification key bound to the ID token from the OpenID provider.

23 Claims, 7 Drawing Sheets

(56) References Cited

OTHER PUBLICATIONS

Jens Groth and Mary Maller, "Snarky signatures: Minimal signatures of knowledge from simulation-extractable SNARKs,". In Jonathan Katz and Hovav Shacham, editors, CRYPTO 2017, Part II, vol. 10402 of LNCS,pp. 581-612. Springer, Heidelberg, Aug. 2017.
Ethan Heilman, Lucie Mugnier, Athanasios Filippidis, Sharon Goldberg, Sebastien Lipman, Yuval Marcus, Mike Milano, Sidhartha Premkumar, and Chad Unrein. "OpenPubkey: Augmenting OpenID connect with user held signing keys. Cryptology ePrint Archive," Report 2023/296, 2023. https: //eprint.iacr.org/2023/296.
Santiago Palladino, "Sign in with google to your identity contract (for fun and profit)," Oct. 2019.
Sanghyeon Park, Jeong Hyuk Lee, Seunghwa Lee, Jung Hyun Chun, Hyeon-myeong Cho, MinGi Kim, Hyun Ki Cho, and Soo-Mook Moon, "Beyond the blockchain address: Zero-knowledge address abstraction," Cryptology ePrint Archive, Report 2023/191, 2023. https://eprint.iacr.org/2023/191.
N. Sakimura et al., "OpenID Connect Core 1.0 incorporating errata set 1", The OpenID Foundation., 2014.
T. Hansen, "US Secure Hash Algorithms (SHA and HMAC-SHA)", AT&T labs, Jul. 2005.
Thomas Chen et al., A Review of zk-SNARKs:, May 16, 2022.

\* cited by examiner

Header 402

```
Unset
{
"alg": "RS256",
"kid": "96971808796829a972e79a9d1a9fff11cd61b1e3",
"typ": "JWT"
}
```

Payload 404

```
Unset
{
"iss": "https://accounts.google.com",
"azp": "979982304237-msop9ep45u2uo98mmangmngv8d84qdc8k.apps.googleusercontent.com",
"aud": "979982304237-msop9ep45u2uo98hapqmngv8d84qdc8k.apps.googleusercontent.com",
"sub": "12345432999990055683",
"nonce": "16637918813908060261870528903994038721669799613803601616678155511",
"iat": 1682002642,
"exp": 1682006242,
"jti": "a8a0728a3ffd5dc81ecfd0ea81d0d33d803eb830"
}
```

Public Key 406

```
Unset
{
"e": "AQAB",
"kty": "RSA",
"n": "vfBbH3bcgTzYXomoShmimATzkEF0QJuhMYmwxOIrpdKT6M15b6KBVhZsPfwbRNoui3iBe8xLON2VHarDgXR
```

ZERO-KNOWLEDGE PROOFS FOR LOGIN

BACKGROUND

Many applications authenticate users through traditional credential mechanisms like passwords. The burden of creating and remembering unique passwords, each with high enough entropy, has become a barrier to onboard users onto new applications.

One way to reduce this burden is to use the fact that people already have a GMAIL account, a FACEBOOK account, or an account with another provider. The OpenID Connect protocol allows 3rd party platforms to leverage GOOGLE, FACEBOOK, or another provider as OpenID providers to allow users to authenticate, without getting visibility into their actual passwords.

Some applications are not ideal to use with the OpenID Connect protocol as an authentication mechanism, because those applications are required to post the authentication claims that contain Personal Identifiable Information (PII) or email addresses in public. For example, a user might not want an untrustworthy application to learn personally identifying information. In another example, a user might not want an application whose function is to provide anonymity to the user to learn personally identifying information. An example of an application that might be used to provide anonymity, might be a wallet used to transact on a blockchain.

BRIEF DESCRIPTION OF THE SEVERAL VIEWS OF THE DRAWINGS

The present technology will be described with reference to the appended drawings. The drawings aid in the description of the present technology and are not to be considered to be limiting the scope of the appended claims. The accompanying drawings include:

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Some applications are not ideal to use with the OpenID Connect protocol as an authentication mechanism, because those applications are required to post the authentication claims that contain Personal Identifiable Information (PII) or email addresses in public. For example, a user might not want an untrustworthy application to learn personally identifying information. In another example, a user might not want an application whose function is to provide anonymity to the user to learn personally identifying information. An example of an application that might be used to provide anonymity might be a wallet used to transact on a blockchain.

In the context of wallets transacting on a blockchain, existing solutions relying on OpenID Connect suffer from at least one of two issues: (1) They rely on trusting extra entities beyond the OpenID provider (e.g., trusted hardware or a new committee of nodes), or (2) They put sensitive data (e.g., email) directly on the blockchain posing a significant privacy concern. Most traditional authentication credentials usually include Personal Identifiable Information (PII) like the full username, user image, email, etc.

The present technology addresses these drawbacks by providing a mechanism to utilize the OpenID Connect protocol to login to anonymous user accounts (user accounts that are separate from user Personal Identifiable Information). These anonymous user accounts can be used to conduct transactions on a blockchain, where anonymity is often desired.

The present technology provides a balance between a user friendly secure authentication procedure, such as OpenID Connect, and privacy on the blockchain and the wallet. While the present technology refers to OpenID Connect in many examples to illustrate the concepts of the present technology, it will be appreciated by those of ordinary skill in the art that any authentication protocol can be used with the present technology provided that it provides the features required to carry out the present technology. References to OpenID Connect and OpenID providers are intended as exemplary only, and should not be considered limiting unless recited in the appended claims.

In some embodiments, zero-knowledge proofs (ZKPs) can be applied to the systems and methods herein to provide succinct proof of the truth of a statement without providing a corresponding witness to a third party. This preserves the privacy of the witness, while also keeping the proof short (e.g., no exchange of the entire contents to the third party) and fast to verify. The application of ZKPs allows a third party/verifier to know that the statement is true while revealing nothing about why it is true.

In some embodiments, the present technology can allow a user to use the OpenID Connect protocol, or another authentication protocol linked to an existing user account, to login to an account that has an anonymous user account ID. More specifically, the present technology can programmatically combine (such as with a deterministic hash function) information received from an authentication protocol with a random value to yield a unique anonymous user account ID. By using a trusted authentication protocol and provider, such as OpenID Connect, the present technology provides a user experience that avoids burdening the user with learning new authentication information. The present technology permits the user to create new, anonymous identities from existing identities with authentication providers.

The present technology also makes use of the ability within an authentication protocol, such as the OpenID Connect protocol, to embed a chosen nonce into the token signed by the authentication provider. This allows for embedding hashes of cryptographic keys, like signature verification keys, into ID tokens received from the authentication provider that authenticates the user. Subsequently, the user can sign messages that can be verified using the verification key bound to the ID token from the authentication provider. While the OpenID Connect protocol issues a token that includes a nonce field in which the present technology can introduce specified data, it will be appreciated that other authentication providers may provide different fields for which the present technology can utilize for the same purpose—to embed custom nonce data including keys, policies, and other information into a data object that is signed by the authentication provider.

In some embodiments, the present technology can also specify policies within the custom nonce data, such as conditions in which the signature verification key is valid. In this way, the signature verification key is an ephemeral public key that is useful for a limited duration or a limited number of uses. One benefit of such a system is that once a third-party service has accepted the zero-knowledge proof, the third-party service does not need to repeat the zero-knowledge proof for every transaction between the account service and the third-party service. Rather, the authentication can remain in accordance with the policy in the custom nonce data and transactions can continue to be signed by the ephemeral public key until it has expired.

The above is a description of some of the advantages of the present technology. Additional features and advantages will be addressed in more detail herein.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software. In some instances, a user can refer to a user account associated with a particular electronic device.

Figure 1:
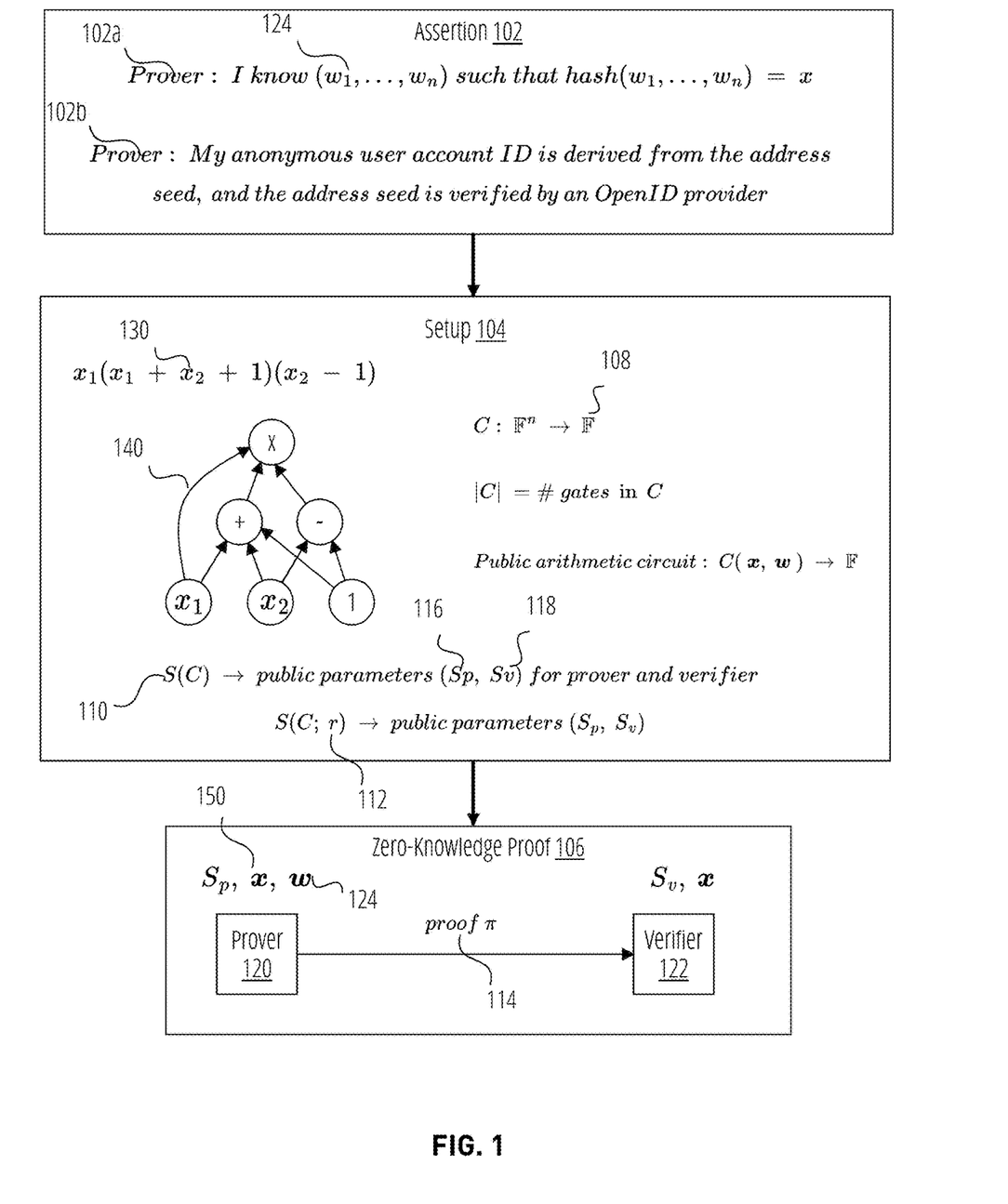
FIG. 1 illustrates some concepts behind a zero-knowledge proof in accordance with some embodiments of the present technology.

FIG. 1 illustrates some concepts behind a zero-knowledge proof in accordance with some embodiments of the present technology.

Zero-knowledge proofs (ZKPs) are a cryptographic concept that allows one party, called the prover 120, to prove to another party, called the verifier 122, that a particular statement is true without revealing any additional information about the statement. In more detail, zero-knowledge proofs enable one party to run an arbitrary program 108 with secret inputs and then prove to another party that the program accepted the inputs as valid and was executed correctly without revealing anything about the secret inputs or the execution of the program. In FIG. 1, the statement or inputs are the assertion 102.

The assertion 102 illustrates a generic assertion 102a, which states that the prover 120 knows something, called a witness, such that the hash of that witness has a value x. This statement can be mathematically proved as will be explained below, such that the verifier can be nearly certain that the prover 120 is telling the truth. In the context of the present technology, the specific assertion 102b is that the anonymous user account ID is derived from an address seed that was verified by an OpenID provider.

There are many different variations of zero-knowledge proofs. In some embodiments, the present technology utilizes variations of zero-knowledge proofs that are non-interactive. Non-interactive refers to the property of the zero-knowledge proof that the prover 120 sends their argument in a proof 114 of their knowledge to the verifier 122, and the verifier 122 can accept the prover has the knowledge without further interrogation of the prover 120. The non-interactive property helps the zero-knowledge proof be fast enough for many practical applications. As will be explained herein, some non-interactive zero-knowledge proofs require a trusted setup 104 where a common reference string 110 is created. The trusted server is often facilitated by a trusted setup service that is not party to the transaction.

Another property of some zero-knowledge proofs is that they are succinct. In this context, this means that the proof 114 itself is succinct enough for an application to store the proof efficiently. However, to obtain this property, the zero-knowledge proof needs a setup 104 as will be addressed further below.

One type of zero-knowledge proof that is useful in the context of the present technology is a zk-SNARKs (zero-knowledge succinct non-interactive arguments of knowledge). A zk-SNARK is a specific type of zero-knowledge proof that provides succinct and efficient proofs of knowledge.

The term "SNARK" stands for "Succinct Non-interactive ARgument of Knowledge." Zk-SNARKs are designed to generate proofs 114 that are very short and require minimal computational resources to verify. The proof size is typically independent of the complexity of the statement being proven, which makes zk-SNARKs highly efficient.

In some zk-SNARKs the "proof of knowledge" property allows the prover 120 to convince the verifier 122 not only that a statement is true, but also that the prover 120 possesses knowledge of the information necessary to prove the statement. This property ensures that the prover 120 cannot produce a valid proof without actually knowing the underlying secret (witness) or data.

Zk-SNARKs rely on advanced cryptographic techniques, specifically pairing-based elliptic curve cryptography and certain mathematical operations called bilinear maps. These techniques enable the generation of short proofs and efficient verification. In a zk-SNARK construction, the prover 120 first creates a "program" 108 during a setup 104 that represents the computation they want to prove. The program 108 can be converted into an internal intermediate representation, e.g., boolean circuits 140, quadratic arithmetic programs. A program 108 represents a computation as a set of polynomial 130 equations.

Prover 120 constructs one or more polynomial equations that represent the computation it wants to prove that includes a witness 124, which is the knowledge that the prover 120 wants to prove without revealing the witness 124. Prover 120 constructs a zk-SNARK proof 114 using the witness 124 polynomial, the program 108, and additional cryptographic operations. The proof is a succinct representation of its knowledge of the solution to the equations.

The zk-SNARK requires some setup 104 to generate the program 108. In some embodiments, the setup is done by an external trusted party or a distributed multi-party computation. In some embodiments, the setup can be done by the user or the wallet provider. The setup 104 can be performed by the prover 120 for maximum security, or it can be performed by a trusted provider in what is known as a trusted setup. In order to provide the zero-knowledge aspect of the zero-knowledge proof a random value 112 is used. The random value 112 can be used to compute common reference string 110 so that information that is public is further obfuscated. The common reference string 110 can include prover parameters 116 and verifier parameters 118. The random value 112 should be discarded at the end of the setup 104 to ensure that no party can either derive the witness 124 or impersonate the prover 120.

The setup may only be needed to be performed once. Thereafter, the prover 120 and verifier 122 can reuse the same common reference string repeatedly. Note that not all non-interactive zero-knowledge proofs require a trusted setup process and such alternative non-interactive zero-knowledge proofs can also be used in the context of the present technology.

When the prover 120 wants to prove something to the verifier 122, the prover can calculate a zero-knowledge proof using the program 108 and common reference string 110 obtained during the trusted setup, the public inputs 150, and by providing the witness 124. A random value (different than the random value 112 that is forgotten after the trusted setup) can be combined with the witness 124 to ensure that the witness 124 remains confidential. While not shown in FIG. 1, the creation of the proof can be computationally expensive, but the verification of the proof is less complex.

Verifier 122 uses the common reference string 110 of the zk-SNARK scheme, the public inputs 150, and the proof generated by prover 120 to verify its correctness. Verifier 122 can efficiently check if the proof is valid without learning anything about Prover's 120 secret value "$w_1, \ldots, w_n$."

The proof of knowledge property ensures that prover 120 could not have generated a valid proof without knowing a value "$w_1, \ldots, w_n$" that satisfies the equations. If an attempt is made to forge a proof without possessing the necessary knowledge, the verification process would fail.

By using the program 108 and cryptographic techniques, zk-SNARKs enables the prover 120 to convince the verifier 122 of knowledge about the underlying secret without explicitly revealing the secret itself. This property is crucial for preserving privacy and confidentiality while providing evidence of correctness. In some embodiments, for example, the properties related to the application of zk-SNARKs can be useful for public systems based on private information, such as blockchains and other similar verification systems.

Figure 2:
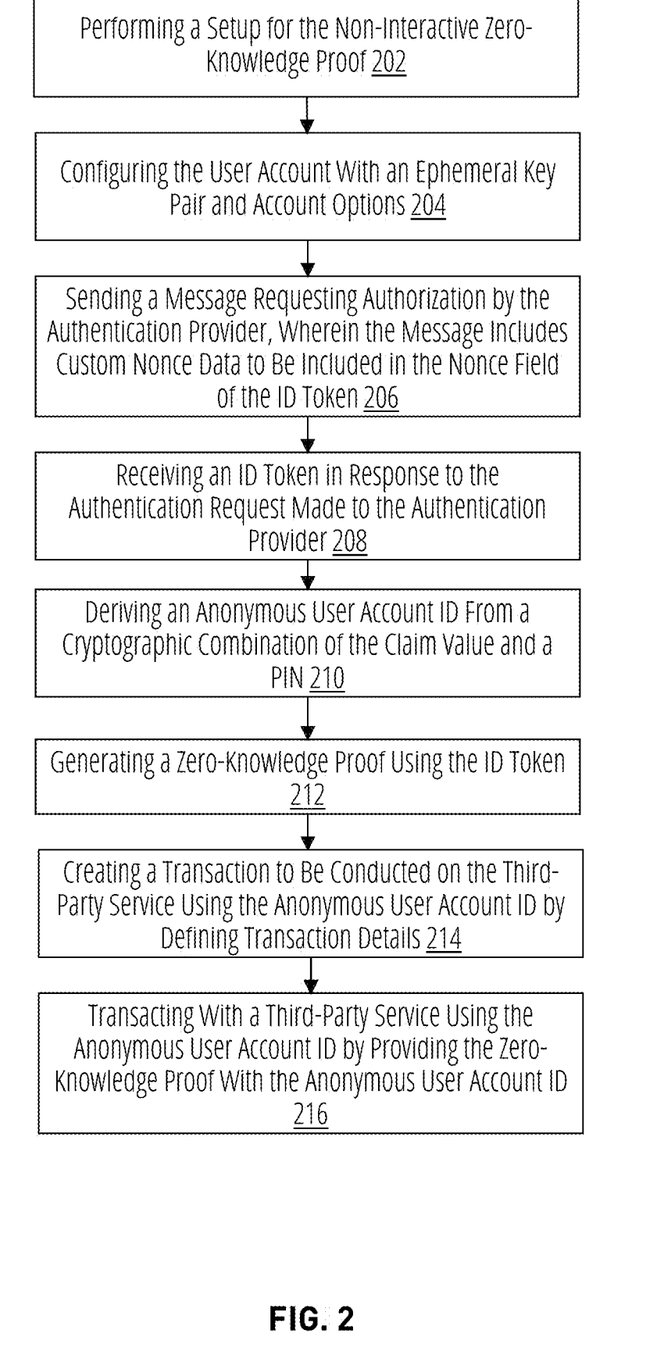
FIG. 2 illustrates an example routine for generating an anonymous user account ID with an account service and to authenticate with a third-party service using a zero-knowledge proof in accordance with some embodiments of the present technology.
Figure 3:
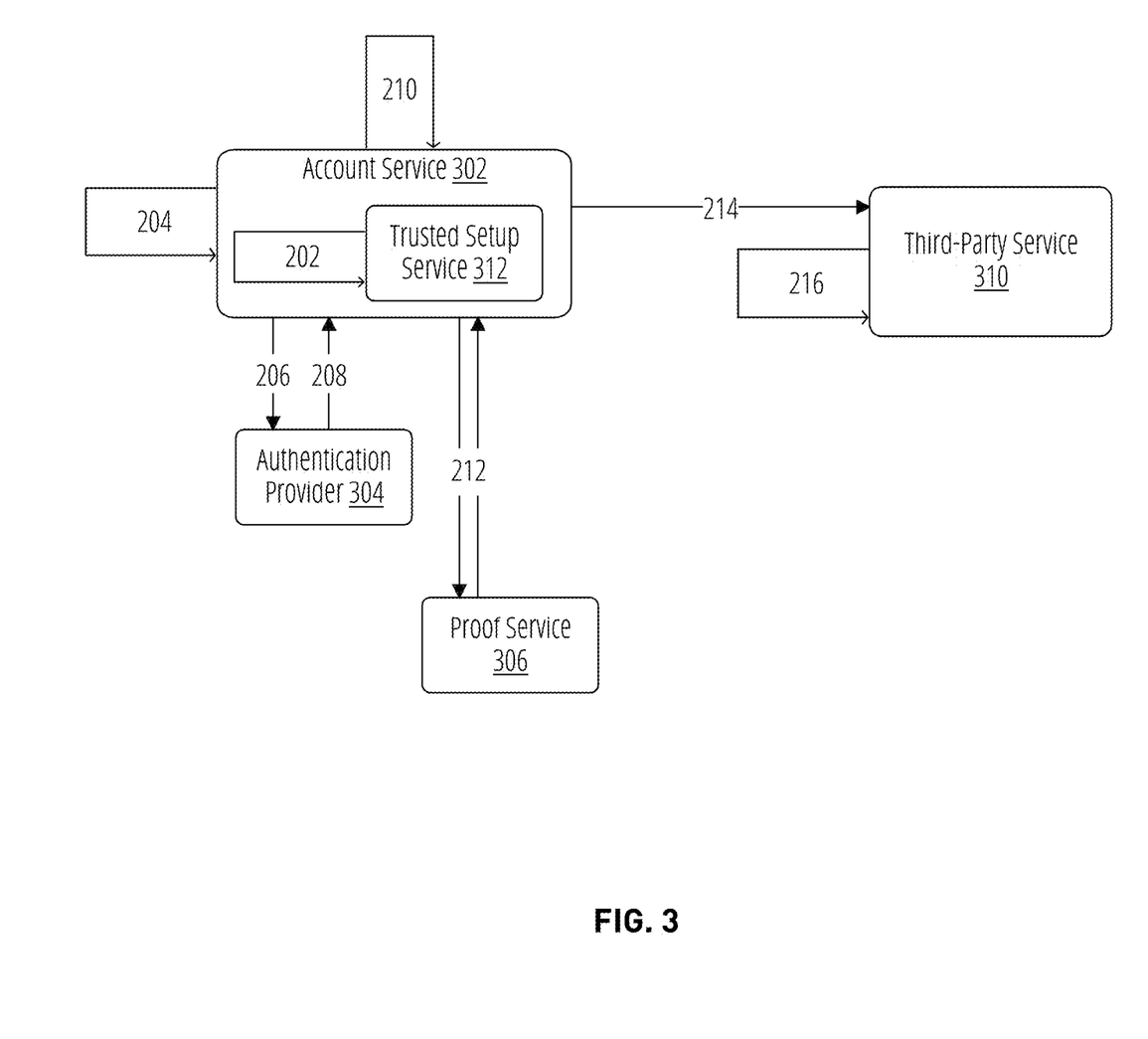
FIG. 3 illustrates an example sequence diagram in accordance with some embodiments of the present technology.

FIG. 2 illustrates an example routine for generating an anonymous user account ID with an account service and to authenticate with a third-party service using a zero-knowledge proof attesting that the user behind the anonymous user account ID was authenticated by an authentication provider and that they have a true and valid identity in accordance with some embodiments of the present technology. FIG. 3 illustrates an example diagram illustrating the routine depicted in FIG. 2. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As addressed in FIG. 1, in order to use some types of zero-knowledge proofs a setup process is used to establish the common reference strings that will be shared between parties. According to some examples, the method includes performing a setup for the non-interactive zero-knowledge proof at block 202. For example, the trusted setup service 312 illustrated in FIG. 3 may perform a setup for the non-interactive zero-knowledge proof. The setup provides the common reference string, including the prover parameters and verifier parameters as addressed in FIG. 1.

As introduced above, the present technology utilizes zk-SNARK as the zero-knowledge proof. There are several varieties of zk-SNARKs, and in some embodiments, the present technology utilizes a type of zk-SNARK called a Groth16 protocol. Groth16 requires the one-time setup of a structured common reference string, which depends upon the specific circuit. As depicted in FIG. 3, the setup is a trusted setup, which is easier for the prover 120, but the prover 120 could perform their own setup if they are capable. While the present description refers to non-interactive zero-knowledge proofs that require a trusted setup, and refers specifically to Groth16, such references are merely exemplary, and persons of ordinary skill in the art will recognize that alternative types of zero-knowledge proofs and alternative zk-SNARKs can be utilized with the present technology. Discussions of setups, non-interactive zero-knowledge proofs, zk-SNARKs, Groth16, etc. should not be considered to limit the present technology unless specifically referred to in the appended claims.

In some embodiments, the present technology utilizes a standardized circuit which can be used and reused by any set of provers and verifiers. However, in some embodiments, even when using the standardized circuit, it may be desirable to perform the trusted setup for each authentication provider because each authentication provider might use a different ID token. The standardized circuit has the advantage that less setup is needed, but has a disadvantage of relying on public key infrastructure, and requires extra trust with the trusted setup service 312.

In FIG. 3, the trusted setup provider is shown as part of the account service 302, but the trusted setup service 312 can also be a third-party provider.

In some embodiments, the present technology supports a bespoke setup that utilizes a bespoke mathematical circuit. The anonymous user account ID can operate in a private mode where the user account creates their own mathematical circuit and that avoids the trusted setup service learning secret data. One advantage of a bespoke setup is that there is no need for a public key exchange. The bespoke mathematical circuit might be configured to not use the authentication provider as an input to the bespoke mathematical circuit, whereby the authentication provider is hidden from a validator of the zero-knowledge proof. The bespoke mathematical circuit might be configured to use inputs from multiple authentication providers as inputs to the bespoke mathematical circuit. The bespoke mathematical circuit can be customized according to the requirements of the user account. But a downside is that a separate setup might be needed for every prover and verifier combination and the common reference string needs to be shared each time. Another downside is that the prover needs to remember the bespoke setup parameters. Whereas with a common setup provided by the trusted setup service 312, the setup common reference string could be shared widely or stored publicly.

Another option for the circuit setup is to allow the circuit to receive attestations from any of a plurality of authentication providers or to receive attestations from several in the same transaction. In some embodiments, it can be possible to hide which authentication provider performed the attestation.

While various options for the mathematical circuit and setup have been addressed above, the distinction of whether the circuit setup is standardized or bespoke is a matter of implementation. Any of the options described as options for a bespoke mathematical circuit can be used in the standardized mathematical circuit. The distinction for a standardized mathematical circuit is that it is configured such that a user does not need to configure their own mathematical circuit, and instead they can use whatever mathematical circuit is provided by the account service 302. The distinction for the bespoke mathematical circuit is that the user can configure and utilize their own customized mathematical circuit.

The account service 302 can be any type of provider. In the context of the present technology, the account service 302 is a wallet 314 provider being used to authorize transactions on a blockchain (third-party service 310) where the transactions on the blockchain are intended to occur without putting any of the user's Personal Identifiable Information on the blockchain. However, the account service 302 can also be a credential manager that stores one or more unique user names (anonymous user account IDs). Or the account service 302 could be any provider that simply desires to provide anonymous user account IDs in the hosting of their own service.

According to some examples, the method includes configuring the user account with an ephemeral key pair (ephemeral secret key, ephemeral public key) and account options at block 204. The ephemeral public key may be active for a certain amount of time, after which the ephemeral key expires and another one needs to be generated. The ephemeral key pair and account options will allow the user of the account to configure policies for how the account should be used, and how often the zero-knowledge proof should be utilized to login with third-party services 310.

For example, the account service 302 illustrated in FIG. 3 may configure the user account with an ephemeral key pair and account options. The account service can generate (if the account service utilizes its own public key infrastructure) or acquire (if the account service utilizes a third-party public key infrastructure) an ephemeral key pair including an ephemeral secret key and an ephemeral public key.

The user can also configure the anonymous user account at the account service with one or more policies pertaining to the use of the ephemeral public key or limits on the use of information, such as an ID token received from the OpenID provider as part of the OpenID Connect protocol. For example, the policies can include key expiration rules, rules limiting the ID token for use with specific transaction partners or transaction types or transaction parameters (use for NFTs or transfers up to $1,000), rules limiting the ID token for single use, rules specifying situations the ephemeral public key might not be needed, etc. The policies can also require a specific authentication provider to be utilized for certain types of transactions. A specific policy contemplated by the present technology is to provide a maximum number of times the ephemeral public key can be used, or an expiration time after which the ephemeral public key expires and cannot be used.

The user can also configure the anonymous user account with a user code. As will be addressed in greater detail below, the user code is a privacy tag that is used to unlink the user identity at the authentication provider with the anonymous user account ID. In some embodiments, the anonymous user account ID is to be used as a wallet address for blockchain transactions so it is important that the anonymous user account ID is not linkable to the user identity at the authentication provider. In some embodiments, the user code can be stored by the account service so that the user is not burdened with remembering the user code for most transactions. However, if the user desires, they can manage the user code and provide it to the account service 302 when it is needed. It is important that the user code be kept secret.

According to some examples, the method includes sending a message requesting authorization by the authentication provider, wherein the message includes custom nonce data to be included in the nonce field of an ID token generated by the authentication provider at block 206. For example, the account service 302 illustrated in FIG. 3 may send a message requesting authorization by the authentication provider, wherein the message includes custom nonce data to be included in the nonce field of the ID token. The sending of the message requesting the authorization by the authentication provider initiates the authentication protocol with the authentication provider. In the context of the OpenID Connect protocol, the account service is acting as a relying party.

The message requesting the authorization by the authentication provider can be received by the authentication provider. The custom nonce data included with the message can include an ephemeral public key and any policy information to be associated with the ephemeral public key, such as a key expiration. In some embodiments, the custom nonce data also includes a random value. The random value is to achieve strong unlinkability between the anonymous user account ID (addressed below) and the account identity at the authentication provider. The result is that even the authentication provider cannot link a user's identity at the authentication provider and the anonymous user account ID.

Figure 4:
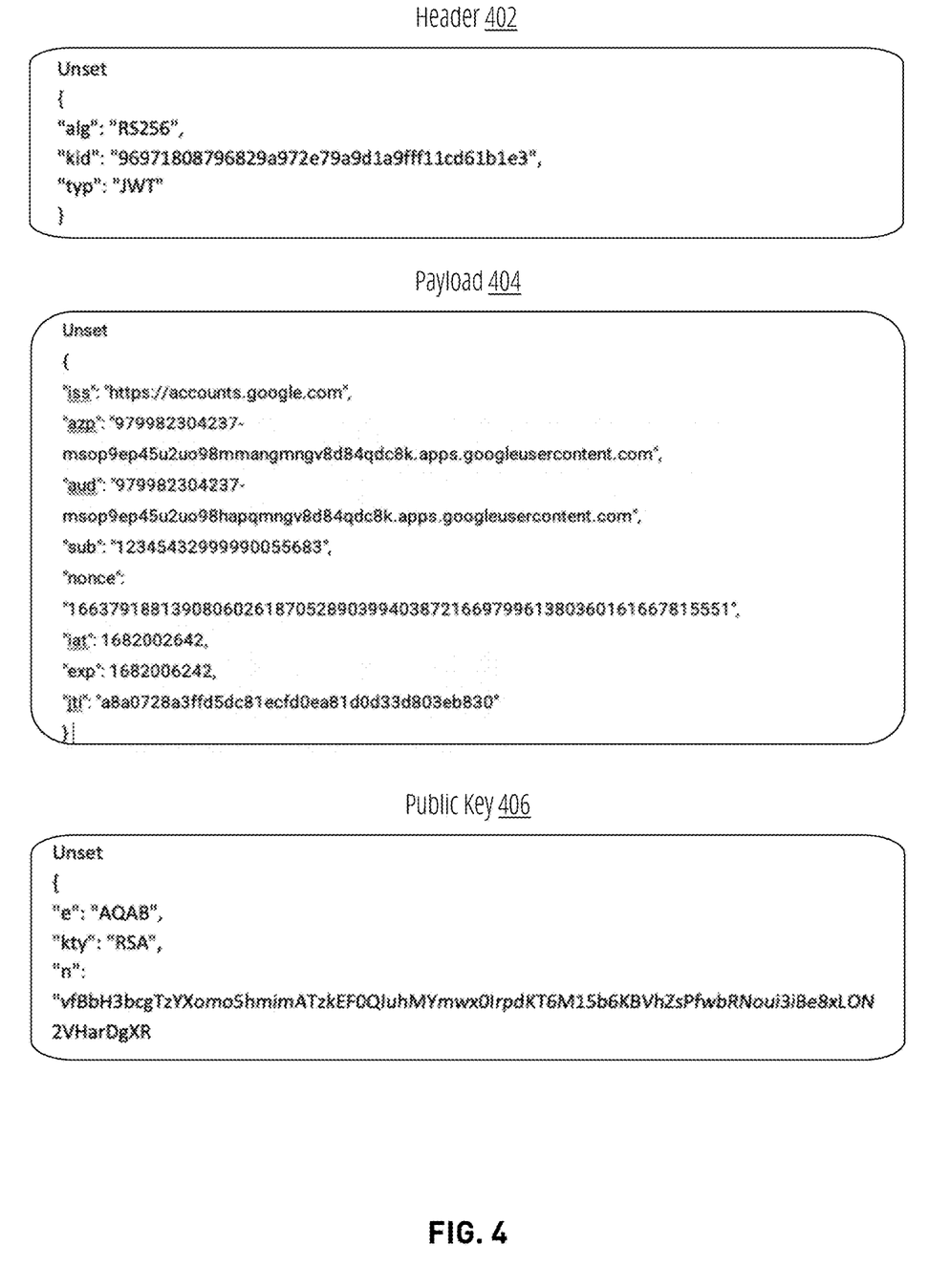
FIG. 4 illustrates an example ID token in accordance with some embodiments of the present technology.

In the OpenID Connect protocol, the authentication provider returns an ID token, typically as a JSON-Web-Token. FIG. 4 illustrates the header 402, payload 404, and public key 406 portions of the ID token. As noted herein, reference to the OpenID Connect protocol and a particular format of an ID token is made for example only. Any authentication provider that can authenticate the user and that provides a signed data object including the custom nonce data within it can be the authentication provider. Additionally, the particular format of the ID token and the names of the data fields within should also not be considered a limitation on the present technology.

According to some examples, the method includes receiving an ID token in response to the request to authenticate made to an authentication provider at block 208. For example, the account service 302 illustrated in FIG. 3 may receive an ID token in response to the request to authenticate made to an authentication provider. FIG. 4 illustrates an example ID token including the header 402, payload 404, and public key 406 portions of the ID token. The header 402 includes a key ID which uniquely identifies the ID token. The payload 404 includes a plurality of claims including claim values such as an 'Iss' claim which is an identifier of the issuer of the ID token, an 'aud' claim which identifies the relying party, a 'sub' claim which is an identifier of the subject user account being authenticated, an 'email' claim which is an email address of the user account being authenticated, and a 'nonce' claim including the custom nonce data (that was included in the request to authenticate). The public key 406 includes the public key of the authentication provider, which is used to sign the whole ID token.

The custom nonce data is populated using the data provided to the authentication provider by the account service 302. Therefore, the policy information and the user's own ephemeral public key are included in the custom nonce data and are signed by the authentication provider's public key 406 in the ID token. The signed ID token thus acts as a certificate for the ephemeral public key, which can be reused and the corresponding ephemeral secret key can be used to sign any number of transactions.

According to some examples, the method includes deriving an anonymous user account ID from a cryptographic combination of the claim value and the user code at block 210. For example, the account service 302 illustrated in FIG. 3 may derive an anonymous user account ID from a cryptographic combination of the claim value and the user code, for example, the user code setup at block 204. While this step is shown occurring in the middle of the flow chart, it can also occur prior to requesting the authentication from the provider at block 206.

The deriving of the anonymous user account ID further utilizes one of the claim values from the ID token that identifies the user account (e.g., an account identifier from the 'sub" claim or the "email" claim of the ID token). In the OpenID Connect protocol, the "sub" claim is preferred because the OpenID Connect protocol mandates that providers do not change this identifier. However, in some cases, it might make sense to use other claim values for many reasons: (a) Better UX as people find usernames or emails more intuitive, (b) Discoverability (when such is desired).

The cryptographic combination of the inputs used to create the anonymous user account ID is a hash value generated by a hash function receiving the claim value and the user code (along with any other information that is desired) as an input. The anonymous user account ID becomes a hash of the account ID plus the user code. The user code can be held by the account service or another service like a password manager. Since no party has both the user's account ID from the authentication provider and the user code, no one can recreate the anonymous user account ID.

In some embodiments, when it is desired to allow the user's email address or other Personal Identifiable Information to become visible the user code can be value-less to provide a user code-less mode that does not protect the Personal Identifiable Information of the user account.

In some embodiments, an authentication provider identifier, such as the "iss" can also be included in the information used to derive the anonymous user account ID. This links the particular anonymous user account ID to the authentication provider.

In some embodiments, the anonymous user account ID can further be derived from an account service 302 identifier. This links the anonymous user account ID to the account service. In such embodiments, the anonymous user account ID is derived from a combination identifier of the user account at the authentication provider, the user code, and account service identifier. Such embodiments can be useful if the authentication provider utilizes a different identifier for each relying party (a e.g., the account service). However, this would require the user always to utilize the same authentication provider to authenticate each time in order to derive the same anonymous user account ID.

With each additional identifier, the anonymous user account could become more secure. Since each item of information is included as input into the hash function used to derive the anonymous user account ID, the greater the number of unknown items, the harder it is to discover the inputs. Accordingly, it can be beneficial to bind the public user ID with multiple account services (or intermediate accounts, such as multiple wallets at a particular account service) to obfuscate the public user ID in the creation of the anonymous user account ID. For example, the anonymous user account ID could be derived from hash (public user ID, (account service account 1, . . . , account service account n), the Authentication provider 304 ID, the user code). Since the public user ID is public (e.g., an email address or identifier provided by the authentication provider) it can be desirable to further obfuscate the public user ID by connecting it with multiple accounts.

In most of the embodiments addressed above for deriving the anonymous user account ID, the authentication process described herein is linked to a specific Authentication provider 304, or specific account service 302. However, in some embodiments, the user might wish to be able to utilize different Authentication providers 304 to authenticate with the account service 302, or different account services 302, and still use the same anonymous user account ID. Such flexibility would be desired if a user no longer wanted to rely on one of the Authentication provider 304 options, or if the user wanted to use the same anonymous user account ID with multiple wallets (that might be hosted by different wallet providers. The present technology contemplates several solutions to this use case.

For example, at the time of the initial derivation of the anonymous user account ID, the user could identify each Authentication provider 304 that they might want to use and each account service 302 that they might want their anonymous user account ID to be used with. The account service 302 could authenticate the user with each Authentication provider 304 that might be used. If the anonymous user account ID is to be compatible with different account services 302, each account service 302 might also need to authenticate the user so that all of the information needed to derive the hash is collected (some authentication providers change information in the ID token based on the pair the user to be authenticated and the relying party). However it is obtained, values need to be collected for any account service 302, and any Authentication provider 304, and any variations of the user ID that might come from the Authentication provider 304 (as a result of pairwise variations in user IDs across different relying parties). These values can be input into a hash function along with the user code to derive the anonymous user account ID that can be flexibly used across account services 302 and Authentication providers 304. To avoid the need to collect all of this data each time, the account service 302 can store any of the data that it can't collect from the Authentication provider 304 during the authentication protocol.

In some embodiments, the user may be able to authenticate using different authentication providers 304 when the user configures accounts with each of those providers to use the same email address, phone number, or other identifier. The user could configure their anonymous user account ID to be derived from a hash of the identifier that is in common (e.g., email address) across the multiple authentication providers, and the user code. In this way the anonymous user account ID can be derived for any authentication provider and account service combination. This scheme for deriving the anonymous user account ID is for when the user desires to be less anonymous. For example, the user could use a user code of '0', which would enable anyone that knows the email address to be able to derive the anonymous user account ID and transact with them (e.g., send money to their wallet).

While several mechanisms are addressed above for providing flexibility in the use of multiple account services 302 or Authentication providers 304, persons of ordinary skill in the art will appreciate other mechanisms to achieve a similar purpose, and the present technology is not limited to the example implementations addressed above except when specifically addressed in the appended claims.

Note that the above description of options to derive the anonymous user account ID does not affect the user of the zero-knowledge proof aspects of the present technology. Only one Authentication provider 304 needs to be used to authenticate the user and sign the ID token.

In such embodiments, the account service 302 can assist the user in creating a single anonymous user account ID that is useful with multiple authentication providers and/or relying parties.

According to some examples, the method includes generating a zero-knowledge proof using the ID token at block 212. For example, the account service 302 illustrated in FIG. 3 may generate a zero-knowledge proof using the ID token. As addressed above, the zero-knowledge proof is a non-interactive zero-knowledge proof.

The proof service 306 can be part of the account service 302 or external. The proof service 306 needs to do the greatest amount of computation and therefore it is depicted as separate from account service 302. For example, the account service 302 might be a lightweight application such as that which might run in a browser, or an application running on a personal computer. While the proof service 306 could run in such environments, the creation of the proof 114 might take longer than desired given modern computing hardware.

Since it can be computationally expensive, to avoid the calculation of the zero-knowledge proof at the account service 302, the present technology utilizes the proof service 306. The proof service 306 need not be trusted since, as is described herein, the proof service 306 does not have access to the ephemeral secret key. Without knowledge of the ephemeral private key, an untrusted entity cannot generate a complete signature to sign transactions or messages originating from the account service 302. Therefore, the Zero-Knowledge Proof generation is delegated to the proof service 306, which can be an untrusted entity. Once the proof is generated, the user can verify it efficiently and sign a transaction with the ephemeral private key.

The zero-knowledge proof is generated by the account service 302 interacting with the proof service 306, which creates a zero-knowledge proof for the zero-knowledge proof that was setup at block 202 (whether the standard mathematical circuit or the bespoke mathematical circuit), and the assertion to be proved.

The account service 302 can send, and the proof service 306 can receive, the information required to produce the zero-knowledge proof. In some embodiments, the proof service 306 generates the zero-knowledge proof from the subject ID (or other claim from the ID token), user code, and the ID token itself as private inputs (witness) and computes a hash (e.g., a SHA2 hash) over the ID token, ensures that the subject ID appears in the ID token payload, and reveals non-sensitive claims in the common reference string. For example, the common reference string can include verifier parameters including the authentication provider ID, and the user's ephemeral public key. The witness (claim from ID token, user code, and the ID token) are kept secret, and the ID token that is shared is hashed so that it is not readable by the third-party service 310. These attributes of the present technology ensure that the anonymous user account ID is not linkable to the user identity at the authentication provider.

In some embodiments, it can be desirable to avoid revealing the link between a user's OpenID identity and their anonymous user account ID to the proof service 306. This is done by avoiding sending the user code to the proof service. Instead, the account service 302 can combine the subject ID from the ID token and the user code into the anonymous user account ID and provide that to the proof service 306.

The proof service 306 can be utilized to handle computationally expensive parts of the zero-knowledge proof generation. For example, the proof service 306 can perform the SHA-2 computation and the RSA signature verification (to make sure that the authentication provider's signature is valid). In such embodiments, the account service 302 can perform part of the verification process wherein the account service 302 can confirm that the subject ID hashed with the user code gives the anonymous user account ID, and the proof service 306 can perform the more computationally expensive portions of the proof generation.

In some embodiments, it is also possible to shift the burden of doing the RSA signature verification to the third-party service 310. In such embodiments, the proof service 306 can reveal the SHA-2 hash so that the third-party service 310 can verify the RSA signature. This approach shifts some of the computation from the proof service 306 to the third-party service 310 but erodes some of the anonymity of the transaction because this approach might allow the third-party service 310 to read the ID token. When it is desired that the anonymous user account ID is not linkable back to the user account at the authentication provider, the approach of performing the RSA signature verification at the proof service 306 is preferable.

In some embodiments, another way in which the present technology can further enhance the privacy of the Personal Identifiable Information of the user is by combining all of the sensitive inputs into a single public input by hashing the information together with the random data in the custom nonce. Combining the inputs into a single public input results in a longer zero-knowledge proof generation because there are more inputs that are converted into private witnesses, but the zero-knowledge proof verification by the verifier, the third-party service 310, is faster. This approach is more secure because it is not likely that someone can break the public input apart into its original components. Typically such a protocol would require multiple public inputs (ephemeral pubkey, expiration of the public key, RSA signature of the ID token, etc.), however, in this embodiment, all public inputs can be converted into a single private witness. Since this also reduces the number of public inputs, it has the desirable effect of faster proof verification by the third-party service 310.

According to some examples, the method includes creating and sending a transaction to be conducted on the third-party service using the anonymous user account ID by defining transaction details at block 214. In some embodiments, at least a portion of the transaction is encrypted by an ephemeral secret key of the user account and signed by the user account. The transaction includes the transaction details, the zero-knowledge proof, the verifier parameters, and any additional inputs (ephemeral public key, key expiration, etc.).

The signature on a message contains two parts: (1) a zero-knowledge proof proving the validity of an ID token and showing that it contains the ephemeral public key in the nonce of the ID token, and (2) a signature on the message signed by the ephemeral secret key. In some embodiments, the key expiration can be included in the nonce of the ID token, indicating the time until which the ephemeral public key can be used, e.g., set nonce=hash(ephemeral public key, key expiration).

In some embodiments, it can be possible to avoid using the ephemeral public key if the transaction is a one-time transaction. In such embodiments, rather than use the ephemeral public key in the nonce field, the specific transaction ID can be included in the nonce field such that the proof generated with the ID token can only be used for a one time transaction.

Finally, the user submits the transaction along with the signature, the ephemeral public key, the zero-knowledge proof, the public inputs, auxiliary inputs (e.g., the SHA2 hash of the ID token), and verifier parameters from the common reference string.

According to some examples, the method includes transacting with a third-party service using the anonymous user account ID by providing the zero-knowledge proof with the anonymous user account ID at block 216. For example, the account service 302 illustrated in FIG. 3 may transact with a third-party service using the anonymous user account ID by providing the zero-knowledge proof with the anonymous user account ID. The zero-knowledge proof allows the third-party service to verify that a user corresponding to the anonymous user account ID was authenticated by the authentication provider, but the identity of the user remains anonymous.

The third-party service 310 (verifier) verifies the received inputs using the OpenID provider's 304 public key (e.g., retrieved from the authentication provider at a location listed in a bulletin smart contract or at a well known location), and verifies the inputs using the zero-knowledge proof which proves that the anonymous user account ID of the transaction is associated with an account that was verified by the authentication provider, and verifies the ephemeral signature against the ephemeral public key.

Finally, the third-party service 310 can perform the transaction. In some embodiments, the transaction is a blockchain transaction. After the third-party service 310 verifies the zero-knowledge proof as described in the paragraph above, the blockchain can record the transaction by: writing a new block on the blockchain storing the authentication provider identifier, a smart contract containing the zero-knowledge proof, and the ID token identifier, an authentication provider key, the anonymous user account ID, and public transaction details, wherein the block is signed with the ephemeral secret key.

As introduced above, the account service 302 can be an account manager similar to a password service where the authentication transaction that yields the user account identifier plus the user code is utilized to login to the password manager, wherein the password manager stores sub-PINs that are specific to respective third-party services that utilize respective anonymous user account IDs or passwords.

Figure 5A:
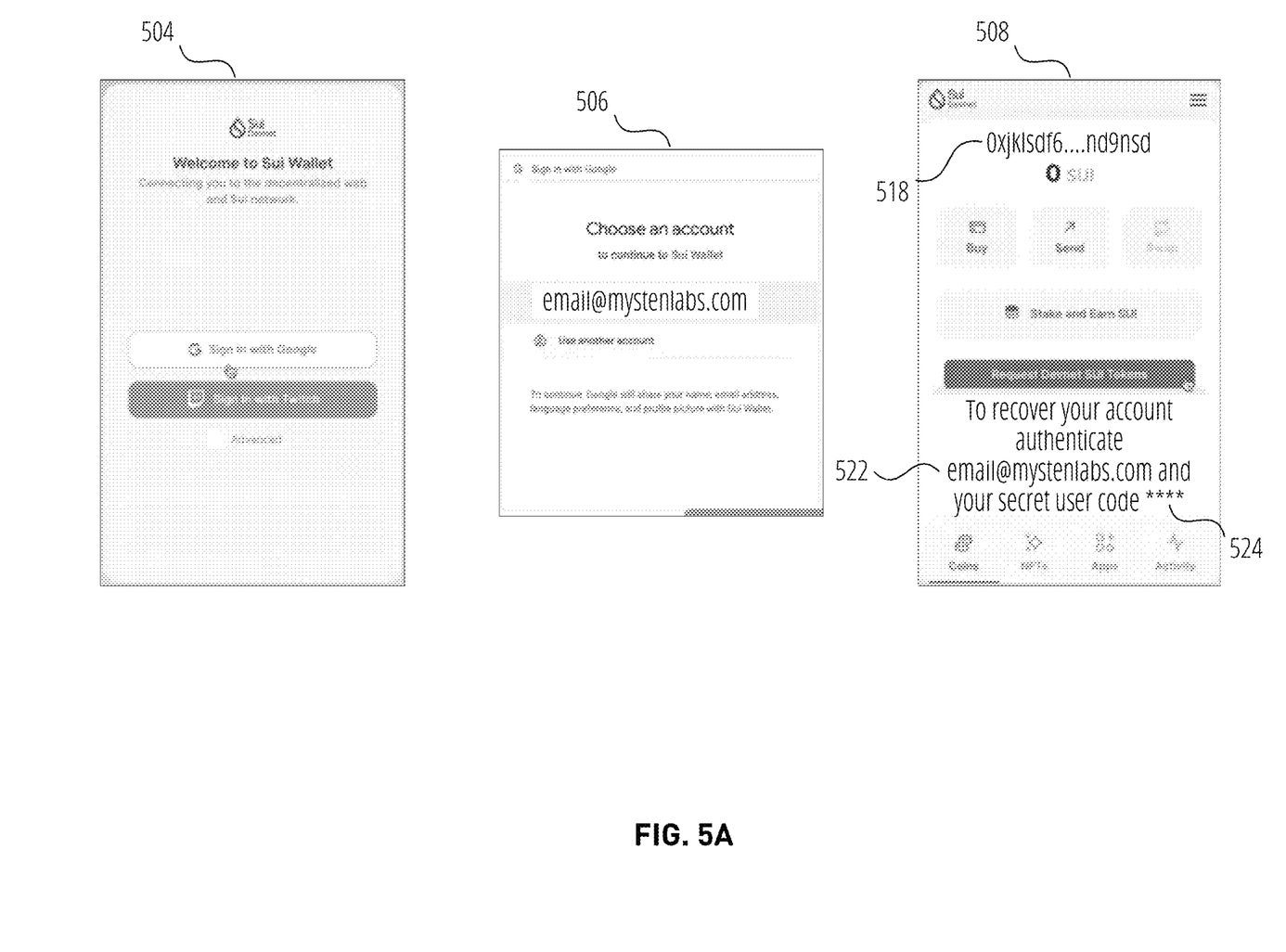
FIG. 5A illustrates a series of graphical user interfaces for creating an anonymous user account ID in accordance with some embodiments of the present technology.
Figure 5B:
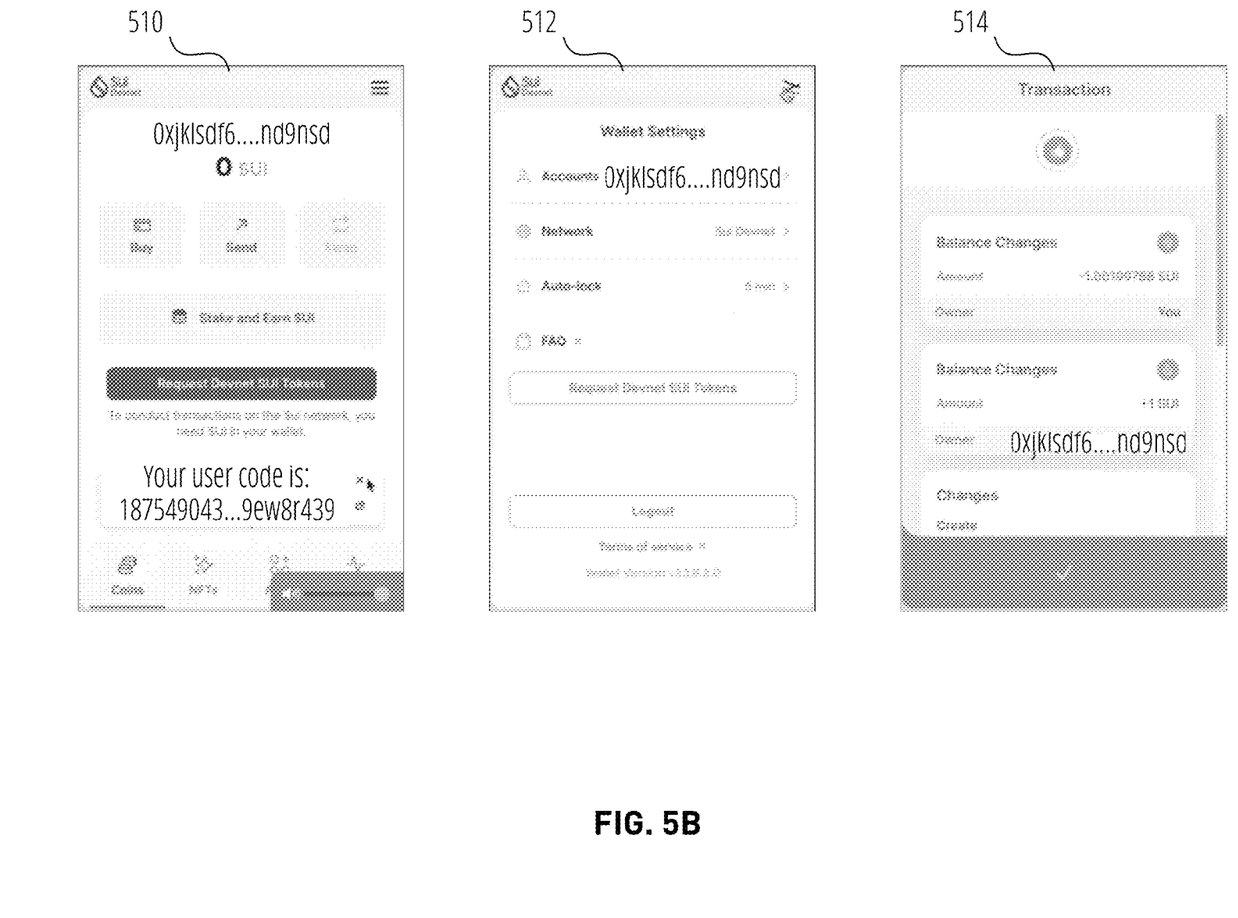
FIG. 5B illustrates a series of graphical user interfaces for performing a transaction using the anonymous user account ID in accordance with some embodiments of the present technology.

The account service 302 can also be a wallet, such as illustrated in FIG. 5A and FIG. 5B, for performing transactions on a blockchain as the third-party service 310.

FIG. 5A illustrates a series of graphical user interfaces for creating an anonymous user account ID in accordance with some embodiments of the present technology. These graphical user interfaces are for example only, and none of the number, sequence, or specific layout of the graphical user interfaces should be considered limiting of the present technology except as explicitly recited in the appended claims.

FIG. 5A illustrates an initial login interface 504 of an account service. In this example, the account service is a digital wallet. As illustrated in the initial login interface 504, the user is presented with an option to select an authentication provider to use to login to the account service.

After selecting one of the authentication providers, the user is taken to an OpenID Connect authentication interface 506 provided by the authentication provider. The user completes the OpenID Connect protocol with the authentication provider which returns the ID token, such as illustrated in FIG. 4.

The account service can extract Personal Identifiable Information from the ID token, such as an identifier of the user account 522, and combine that it a user code 524 provided to the account service and this data can be combined in a hash to yield the anonymous user account ID 518 for use with the account service. All of this information is displayed on account page 508.

As addressed above, only the account service is aware of the user code so although the authentication provider attests to the user's authentication, it cannot derive or learn of the anonymous user account ID.

FIG. 5B illustrates a series of graphical user interfaces for performing a transaction using the anonymous user account ID in accordance with some embodiments of the present technology. These graphical user interfaces are for example only, and none of the number, sequence, or specific layout of the graphical user interfaces should be considered limiting of the present technology except as explicitly recited in the appended claims.

FIG. 5B illustrates an account interface 510 which presents information regarding the account. In this instance, the account service is a wallet for holding cryptocurrency, and account interface 510 shows an outstanding balance of cryptocurrency and provides the option to buy and send and earn cryptocurrency.

The account settings account interface 510 allows a user to switch between anonymous user account IDs if they have more than one. A new anonymous user account ID can be created using the same authentication provider by combining the identifier of the user account with a different user code.

The transaction interface 514 illustrates a record of a transaction completed using the present technology. In this example 1 SUI was transferred from the user's account to another crypto wallet.

Figure 6:
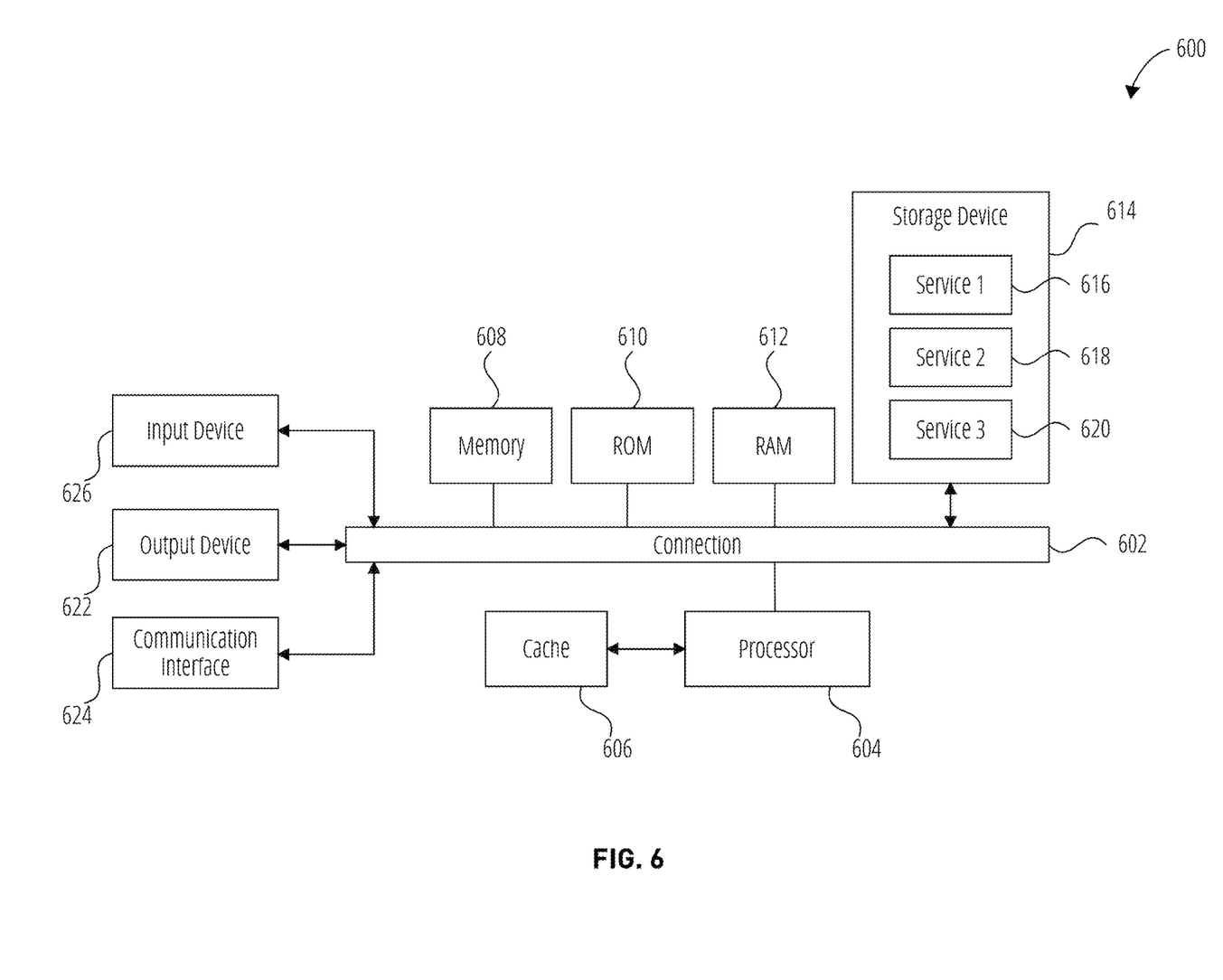
FIG. 6 shows an example of a system for implementing certain aspects of the present technology.

FIG. 6 shows an example of computing system 600, which can be for example any computing device making up the account service 302, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method comprising: receiving, by an account service, an ID token in response to an authentication request made to an authentication provider to authenticate a user with an account with the authentication provider, the ID token including an identifier of the account with the authentication provider and a custom nonce data, the custom nonce data including at least a public key for an anonymous user account ID; generating, by interacting with a proof service, a zero-knowledge proof using the ID token, wherein the zero-knowledge proof is a non-interactive zero-knowledge proof that proves that the account service has authenticated the user with the authentication provider without providing information about the account with the authentication provider; transacting, by the account service with a third-party service, using the anonymous user account ID by providing the zero-knowledge proof with the anonymous user account ID, whereby the third-party service can verify that the user corresponding to the anonymous user account ID was authenticated by the authentication provider, the transacting including a message with transaction details, the message including a signature signed using the public key.

Aspect 2. The method of Aspect 1, further comprising: deriving, by the account service, the anonymous user account ID from a cryptographic combination of the identifier of the account with the authentication provider that is included in the ID token and a user code.

Aspect 3. The method of any of Aspects 1 to 2, wherein the deriving of the anonymous user account ID further utilizes an issuer identifier from the ID token which identifies the authentication provider, whereby the anonymous user account ID is linked to the authentication provider.

Aspect 4. The method of any of Aspects 1 to 3, wherein the deriving of the anonymous user account ID further utilizes multiple authentication provider identifiers, multiple identifiers of the user account, or multiple account service identifiers.

Aspect 5. The method of any of Aspects 1 to 4, wherein the user code can be value-less to provide a user code-less mode that does not protect Personal Identifiable Information of account with the authentication provider.

Aspect 6. The method of any of Aspects 1 to 5, wherein the signature on the message including the zero-knowledge proof proving that the ID token is valid, and showing that it contains the public key in the custom nonce data.

Aspect 7. The method of any of Aspects 1 to 6, wherein the custom nonce data includes random data.

Aspect 8. The method of any of Aspects 1 to 7, wherein the public key is an ephemeral public key tied to a key expiration listed in the custom nonce data.

Aspect 9. The method of any of Aspects 1 to 8, wherein the custom nonce data includes policy information limiting the use of the authentication or the public key to uses defined in the policy information.

Aspect 10. The method of any of Aspects 1 to 9, wherein the custom nonce data limits the ID token for a single use by tying the transaction details to a transaction ID in the ID token, wherein the ID token does not need the ephemeral public key.

Aspect 11. The method of any of Aspects 1 to 10, wherein the custom nonce data limits the ID token for the single use and to a particular authentication provider.

Aspect 12. The method of any of Aspects 1 to 11, wherein the generating the zero-knowledge proof includes combining individual inputs into the zero-knowledge proof generation into a single witness to hide an identifier of the authentication provider, and an RSA signature of the ID token.

Aspect 13. The method of any of Aspects 1 to 12, further comprising: prior to generating the zero-knowledge proof by the proof service, cryptographically combining a user code and the identifier of the account with the authentication provider to obscure the identifier of the account with the authentication provider from the proof service.

Aspect 14. The method of any of Aspects 1 to 13, further comprising: creating a transaction to be conducted on the third-party service using the anonymous user account ID by defining the transaction details.

Aspect 15. The method of any of Aspects 1 to 14, further comprising: configuring, by the account service, a policy pertaining to an ephemeral public key or limits on the use of the ID token; and sending a message requesting authorization by the authentication provider, wherein the message includes the custom nonce data to be included in a nonce field of the ID token.

Aspect 16. The method of any of Aspects 1 to 15, further comprising: performing a setup for the non-interactive zero-knowledge proof to obtain a common reference string, wherein the common reference string includes prover parameters and verifier parameters.

Aspect 17. The method of any of Aspects 1 to 16, wherein the setup is a trusted setup provided by a trusted setup service.

Aspect 18. The method of any of Aspects 1 to 17, wherein the transacting with the third-party service further comprises: sending the message to the third-party service where at least a portion is encrypted by the public key of the anonymous user account, the message including the transaction details, the zero-knowledge proof, the verifier parameters, and any additional inputs.

Aspect 19. A computing apparatus configured to perform the method of any of Aspects 1 to 18.

Aspect 20. A non-transitory computer-readable storage medium, the computer-readable storage medium including instructions that when executed by a computer, cause the computer to perform the method of any of Aspects 1 to 18.

What is claimed is:

1. A method comprising:
receiving, by an account service, an ID token in response to an authentication request made to an authentication provider to authenticate a user with an account with the authentication provider, the ID token including an identifier of the account with the authentication provider and nonce data, the nonce data including at least a public key for an anonymous user account ID;
generating, by interacting with a proof service, a zero-knowledge proof using the ID token, wherein the zero-knowledge proof is a non-interactive zero-knowledge proof that proves that the account service has authenticated the user with the authentication provider without providing information about the account with the authentication provider; and
transacting, by the account service with a third-party service, using the anonymous user account ID by providing the zero-knowledge proof with the anonymous user account ID, whereby the third-party service can verify that the user corresponding to the anonymous user account ID was authenticated by the authentication provider, the transacting including a message with transaction details, the message including a signature signed using the public key in the nonce data.

2. The method of claim 1, further comprising:
deriving, by the account service, the anonymous user account ID from a cryptographic combination of the identifier of the account with the authentication provider that is included in the ID token and a user code.

3. The method of claim 2, wherein the deriving of the anonymous user account ID further utilizes an issuer identifier from the ID token which identifies the authentication provider, whereby the anonymous user account ID is linked to the authentication provider.

4. The method of claim 2, wherein the deriving of the anonymous user account ID further utilizes multiple authentication provider identifiers, multiple identifiers of the user account, or multiple account service identifiers.

5. The method of claim 1, wherein the signature on the message including the zero-knowledge proof proving that the ID token is valid, and showing that it contains the public key in the nonce data.

6. The method of claim 1, wherein the nonce data includes random data.

7. The method of claim 1, wherein the public key is an ephemeral public key tied to a key expiration listed in the nonce data.

8. The method of claim 2, wherein the user code can be value-less to provide a user code-less mode that does not protect Personal Identifiable Information of account with the authentication provider.

9. The method of claim 7, wherein the nonce data includes policy information limiting the use of the authentication or the public key to uses defined in the policy information.

10. The method of claim 1, wherein the generating the zero-knowledge proof includes combining individual inputs into the zero-knowledge proof generation into a single witness to hide an identifier of the authentication provider, and a signature of the ID token.

11. The method of claim 1, further comprising:
prior to generating the zero-knowledge proof by the proof service, cryptographically combining a user code and the identifier of the account with the authentication provider to obscure the identifier of the account with the authentication provider from the proof service.

12. The method of claim 1, further comprising:
sending a message requesting authorization by the authentication provider, wherein the message includes the nonce data to be included in a nonce field of the ID token.

13. A computing apparatus comprising:
a processor; and
a memory storing instructions that, when executed by the processor, configure the apparatus to:
receive, by an account service, an ID token in response to an authentication request made to an authentication provider to authenticate a user with an account with the authentication provider, the ID token including an identifier of the account with the authentication provider and a nonce data, the nonce data including at least a public key for an anonymous user account ID;
generate, by interacting with a proof service, a zero-knowledge proof using the ID token, wherein the zero-knowledge proof is a non-interactive zero-knowledge proof that proves that the account service has authenticated the user with the authentication provider without providing information about the account with the authentication provider; and
transact, by the account service with a third-party service, using the anonymous user account ID by providing the zero-knowledge proof with the anonymous user account ID, whereby the third-party service can verify that the user corresponding to the anonymous user account ID was authenticated by the authentication provider, the transacting including a message with transaction details, the message including a signature signed using the public key in the nonce data.

14. The computing apparatus of claim 13, wherein the instructions further configure the apparatus to:
derive, by the account service, the anonymous user account ID from a cryptographic combination of the identifier of the account with the authentication provider that is included in the ID token and a user code.

15. The computing apparatus of claim 13, wherein the signature on the message include the zero-knowledge proof proving that the ID token is valid, and showing that it contains the public key in the nonce data.

16. The computing apparatus of claim 13, wherein the public key is an ephemeral public key tied to a key expiration listed in the nonce data.

17. The computing apparatus of claim 16, wherein the nonce data includes policy information limit the use of the authentication or the public key to uses defined in the policy information.

18. The computing apparatus of claim 13, wherein the generating the zero-knowledge proof includes combine individual inputs into the zero-knowledge proof generation into a single witness to hide an identifier of the authentication provider, and a signature of the ID token.

19. A non-transitory computer-readable storage medium, the computer-readable storage medium including instructions that when executed by a computer, cause the computer to:
receive, by an account service, an ID token in response to an authentication request made to an authentication provider to authenticate a user with an account with the authentication provider, the ID token including an identifier of the account with the authentication provider and a nonce data, the nonce data including at least a public key for an anonymous user account ID;
generate, by interacting with a proof service, a zero-knowledge proof using the ID token, wherein the zero-knowledge proof is a non-interactive zero-knowledge proof that proves that the account service has authenticated the user with the authentication provider without providing information about the account with the authentication provider; and
transact, by the account service with a third-party service, using the anonymous user account ID by providing the zero-knowledge proof with the anonymous user account ID, whereby the third-party service can verify that the user corresponding to the anonymous user account ID was authenticated by the authentication provider, the transacting including a message with transaction details, the message including a signature signed using the public key in the nonce data.

20. The computer-readable storage medium of claim 19, wherein the instructions further configure the computer to:
derive, by the account service, the anonymous user account ID from a cryptographic combination of the identifier of the account with the authentication provider that is included in the ID token and a user code.

21. The computer-readable storage medium of claim 19, wherein the generating the zero-knowledge proof includes combine individual inputs into the zero-knowledge proof generation into a single witness to hide an identifier of the authentication provider, and a signature of the ID token.

22. The computer-readable storage medium of claim 19, wherein the instructions further configure the computer to:
prior to generating the zero-knowledge proof by the proof service, cryptographically combine a user code and the identifier of the account with the authentication provider to obscure the identifier of the account with the authentication provider from the proof service.

23. The computer-readable storage medium of claim 19, wherein the authentication provider is an OpenID provider.

* * * * *